United States Patent
Miao

(10) Patent No.: US 12,309,872 B2
(45) Date of Patent: May 20, 2025

(54) DISCONTINUOUS RECEPTION STATE CONFIGURATION METHOD, USER EQUIPMENT AND NETWORK SIDE DEVICE

(71) Applicant: DATANG MOBILE COMMUNICATIONS EQUIPMENT CO., LTD., Beijing (CN)

(72) Inventor: Jinhua Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 376 days.

(21) Appl. No.: 17/789,410

(22) PCT Filed: Oct. 28, 2020

(86) PCT No.: PCT/CN2020/124235
§ 371 (c)(1),
(2) Date: Jun. 27, 2022

(87) PCT Pub. No.: WO2021/135579
PCT Pub. Date: Jul. 8, 2021

(65) Prior Publication Data
US 2023/0044230 A1    Feb. 9, 2023

(30) Foreign Application Priority Data
Dec. 31, 2019   (CN) .......................... 201911422027.9

(51) Int. Cl.
*H04W 76/28*   (2018.01)

(52) U.S. Cl.
CPC .................................. *H04W 76/28* (2018.02)

(58) Field of Classification Search
CPC ............. H04W 76/28; H04W 52/0216; H04W 52/0235; H04W 76/27; H04W 24/02; Y02D 30/70
See application file for complete search history.

(56) References Cited

U.S. PATENT DOCUMENTS

2017/0331610 A1   11/2017   Miao et al.
2018/0070405 A1   3/2018    Yi et al.
(Continued)

FOREIGN PATENT DOCUMENTS

CN    101296495 A    10/2008
CN    102271318 A    12/2011
(Continued)

OTHER PUBLICATIONS

International Search Report for PCT Application PCT/CN2020/124235 issued on Jan. 20, 2021, and its English Translation provided by WIPO.
(Continued)

*Primary Examiner* — Yu-Wen Chang
(74) *Attorney, Agent, or Firm* — Ladas & Parry, LLP

(57) ABSTRACT

The present disclosure provides a DRX state configuration method, a UE and a network side device. The DRX state configuration method for the UE includes: receiving indication information transmitted by a network side device, the indication information being used to indicate at least one first DRX group for the UE to enter a DRX inactive state; and configuring the at least one first DRX group to enter the DRX inactive state in accordance with the indication information.

11 Claims, 4 Drawing Sheets

(56) References Cited

U.S. PATENT DOCUMENTS

| | | | |
|---|---|---|---|
| 2018/0070406 A1 | 3/2018 | Chen et al. | |
| 2020/0037396 A1* | 1/2020 | Islam | H04W 52/0229 |
| 2020/0245395 A1* | 7/2020 | Zhang | H04W 76/28 |
| 2021/0014928 A1 | 1/2021 | Zheng et al. | |
| 2021/0037592 A1* | 2/2021 | Lee | H04W 74/0833 |
| 2021/0092681 A1* | 3/2021 | Nory | H04W 52/0229 |
| 2022/0191793 A1* | 6/2022 | Murray | H04W 52/0232 |
| 2022/0353818 A1* | 11/2022 | Kuang | H04W 76/28 |
| 2023/0026297 A1* | 1/2023 | Kim | H04W 76/28 |

FOREIGN PATENT DOCUMENTS

| | | |
|---|---|---|
| CN | 108616897 A | 10/2018 |
| CN | 109246723 A | 1/2019 |
| CN | 109561488 A | 4/2019 |
| EP | 3383127 A1 | 10/2018 |
| TW | 201112825 A | 4/2011 |
| WO | 2016119174 A1 | 8/2016 |

OTHER PUBLICATIONS

Written Opinion for PCT Application PCT/CN2020/124235 issued on Jan. 20, 2021, and its English Translation provided by WIPO.
Internationally Preliminary Report on Patentability for PCT/CN2020/124235 issued Jul. 5, 2022, and English translation provided by WIPO.
First Office Action and search report for Chinese Patent Application 201911422027.9 issued by the Chinese Patent Office on Mar. 15, 2022, and its English translation provided by Global dossier.
"3rd Generation Partnership Project; Technical Specification Group Radio Access Network; NR; Medium Access Control (MAC) protocol specification (Release 15)," 3GPP TS 38.321, V15.7.0 (Sep. 2019), all pages.
Extended European Search Report for the corresponding European Patent Application No. 20908481.3 issued on May 26, 2023.
"DRX with Multiple Numerologies," 3GPP TSG-RAN2 Meeting #97bis, R2-1702605, Spokane, Washington, USA, Apr. 3-7, 2017, Agenda item: 10.3.1.7, Source: Huawei, HiSilicon, all pages.
"DRX Command MAC Control Element," 3GPP TSG-RAN2 Meeting #99, R2-1709321, Germany, Berlin, Aug. 21-25, 2017, Agenda Item: 10.3.1.10 DRX, Source:ASUSTek, all pages.
"Discussion on UE power saving in CA scenario," 3GPP TSG-RAN2 Meeting #105, R2-1901289, Athens, Greece, Feb. 25-Mar. 1, 2019, Agenda Item: 11.11.4, Source: Huawei, HiSilicon, all pages.
"On the need for multiple active DRX configurations," 3GPP Tsg-Ran WG2 Meeting #105bis, R2-1903123, Xi'an, China, Apr. 8-Apr. 12, 2019, Source: CATT, Agenda Item: 11.11.4.4, all pages.
"cDRX enhancement for CA," 3GPP TSG-RAN WG2 Meeting #107bis, R2-1913196, Chongqing, China, Oct. 14-18, 2019, all pages.
"Email report [107#bis49][NR TEI16] cDRX enhancement for CA," 3GPP TSG-RAN2 Meeting #108, R2-1915292, Reno, USA, Nov. 18-22, 2019, Agenda Item: 6.20.2 RAN2 led TEI16 enhancements—User plane related, Source: Ericsson, all pages.

* cited by examiner

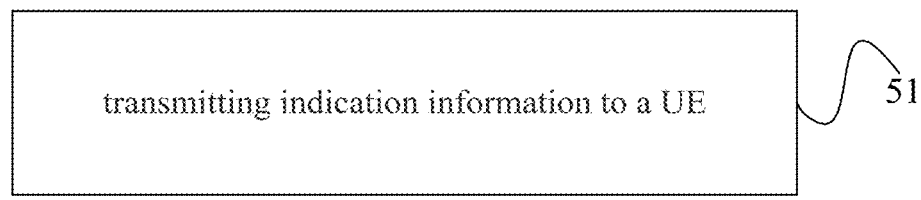
Fig. 4
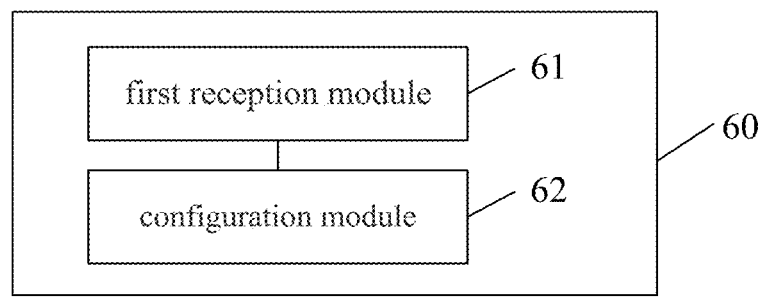
Fig. 5
Fig. 6

DISCONTINUOUS RECEPTION STATE CONFIGURATION METHOD, USER EQUIPMENT AND NETWORK SIDE DEVICE

CROSS-REFERENCE TO RELATED APPLICATIONS

This application is the U.S. national phase of PCT Application No. PCT/CN2020/124235 filed on Oct. 28, 2020 which claims priority to Chinese Patent Application No. 201911422027.9 filed on Dec. 31, 2019, the disclosures of which are incorporated in their entireties by reference herein.

TECHNICAL FIELD

The present disclosure relates to the field of communication technology, in particular to a Discontinuous Reception (DRX) state configuration method, a User Equipment (UE), and a network side device.

BACKGROUND

In an existing standard, with respect to DRX groups, a UE enters a DRX inactive state after a DRX on-duration timer (drx-OndurationTimer) and a DRX inactivity timer (drx-InactivityTimer) for each DRX group have expired, and it is impossible for a base station to indicate one DRX group for the UE to enter the DRX inactive state.

SUMMARY

An object of the present disclosure is to provide a DRX state configuration method, a UE and a network side device, so as to solve the problem in the related art where the DRX inactive state is merely indicated in a simple way with respect to the UE and it is impossible to meet the demand on the UE.

In one aspect, the present disclosure provides in some embodiments a DRX state configuration method for a UE, including: receiving indication information transmitted by a network side device, the indication information being used to indicate at least one first DRX group for the UE to enter a DRX inactive state; and configuring the at least one first DRX group to enter the DRX inactive state in accordance with the indication information.

In a possible embodiment of the present disclosure, prior to receiving the indication information transmitted by the network side device, the DRX state configuration method further includes receiving a DRX parameter configured by the network side device for the UE and group-related information, the group-related information includes DRX groups, or the DRX groups and a first parameter corresponding to each DRX group, and the first parameter includes a serving cell Identity (ID) or a carrier ID.

In a possible embodiment of the present disclosure, when the group-related information includes the DRX groups, the indication information includes at least one piece of information about a target DRX group, and the first DRX group is a DRX group determined in accordance with the information about the target DRX group.

In a possible embodiment of the present disclosure, the information about the target DRX group includes identification information corresponding to the target DRX group.

In a possible embodiment of the present disclosure, when the group-related information includes the DRX groups and the first parameter corresponding to each DRX group, the indication information includes at least one target first parameter, and the first DRX group is a DRX group corresponding to the target first parameter.

In a possible embodiment of the present disclosure, the indication information is transmitted through one of a Media Access Control Control Element (MAC CE), Downlink Control Information (DCI) or Radio Resource Control (RRC) signaling.

In a possible embodiment of the present disclosure, the configuring the at least one first DRX group to enter the DRX inactive state includes at least one of stopping a DRX on-duration timer corresponding to the first DRX group, stopping a DRX inactivity timer corresponding to the first DRX group, or stopping a DRX retransmission timer corresponding to the first DRX group.

In another aspect, the present disclosure provides in some embodiments a DRX state configuration method for a network side device, including transmitting indication information to a UE. The indication information is used to indicate at least one first DRX group for the UE to enter a DRX inactive state.

In a possible embodiment of the present disclosure, prior to transmitting the indication information to the UE, the DRX state configuration method further includes configuring a DRX parameter and group-related information for the UE, the group-related information includes DRX groups, or the DRX groups and a first parameter corresponding to each DRX group, and the first parameter includes a serving cell ID or a carrier ID.

In a possible embodiment of the present disclosure, when the group-related information includes the DRX groups, the indication information includes at least one piece of information about a target DRX group, and the first DRX group is a DRX group determined in accordance with the information about the target DRX group.

In a possible embodiment of the present disclosure, the information about the target DRX group includes identification information corresponding to the target DRX group.

In a possible embodiment of the present disclosure, when the group-related information includes the DRX groups and the first parameter corresponding to each DRX group, the indication information includes at least one target first parameter, and the first DRX group is a DRX group corresponding to the target first parameter.

In a possible embodiment of the present disclosure, prior to transmitting the indication information to the UE, the DRX state configuration method further includes, in the case that there is no data in a cache for a first logic channel of the UE and/or there is no downlink data in the network side device for the UE, determining at least one first DRX group to enter the DRX inactive state.

In a possible embodiment of the present disclosure, the indication information is transmitted through one of an MAC CE, DCI or RRC signaling.

In yet another aspect, the present disclosure further provides in some embodiments a UE, including a transceiver, a memory, a processor, and a program stored in the memory and executed by the processor. The processor is configured to execute the program so as to: receive through the transceiver indication information transmitted by a network side device, the indication information being used to indicate at least one first DRX group for the UE to enter a DRX inactive state; and configure the at least one first DRX group to enter the DRX inactive state in accordance with the indication information.

In a possible embodiment of the present disclosure, prior to receiving the indication information transmitted by the network side device, the processor is further configured to execute the program so as to receive through the transceiver a DRX parameter configured by the network side device for the UE and group-related information, the group-related information includes DRX groups, or the DRX groups and a first parameter corresponding to each DRX group, and the first parameter includes a serving cell ID or a carrier ID.

In a possible embodiment of the present disclosure, when the group-related information includes the DRX groups, the indication information includes at least one piece of information about a target DRX group, and the first DRX group is a DRX group determined in accordance with the information about the target DRX group.

In a possible embodiment of the present disclosure, the information about the target DRX group includes identification information corresponding to the target DRX group.

In a possible embodiment of the present disclosure, when the group-related information includes the DRX groups and the first parameter corresponding to each DRX group, the indication information includes at least one target first parameter, and the first DRX group is a DRX group corresponding to the target first parameter.

In a possible embodiment of the present disclosure, the indication information is transmitted through one of an MAC CE, DCI or RRC signaling.

In a possible embodiment of the present disclosure, when configuring the at least one first DRX group to enter the DRX inactive state, the processor is configured to execute the program so as to perform at least one of stopping a DRX on-duration timer corresponding to the first DRX group, stopping a DRX inactivity timer corresponding to the first DRX group, or stopping a DRX retransmission timer corresponding to the first DRX group.

In still yet another aspect, the present disclosure provides in some embodiments a network side device, including a transceiver, a memory, a processor, and a program stored in the memory and executed by the processor. The processor is configured to execute the program so as to transmit through the transceiver indication information to a UE, and the indication information is used to indicate at least one first DRX group for the UE to enter a DRX inactive state.

In a possible embodiment of the present disclosure, prior to transmitting the indication information to the UE, the processor is further configured to execute the program so as to configure a DRX parameter and group-related information for the UE, the group-related information includes DRX groups, or the DRX groups and a first parameter corresponding to each DRX group, and the first parameter includes a serving cell ID or a carrier ID.

In a possible embodiment of the present disclosure, when the group-related information includes the DRX groups, the indication information includes at least one piece of information about a target DRX group, and the first DRX group is a DRX group determined in accordance with the information about the target DRX group.

In a possible embodiment of the present disclosure, the information about the target DRX group includes identification information corresponding to the target DRX group.

In a possible embodiment of the present disclosure, when the group-related information includes the DRX groups and the first parameter corresponding to each DRX group, the indication information includes at least one target first parameter, and the first DRX group is a DRX group corresponding to the target first parameter.

In a possible embodiment of the present disclosure, prior to transmitting the indication information to the UE, the processor is further configured to execute the program so as to, in the case that there is no data in a cache for a first logic channel of the UE and/or there is no downlink data in the network side device for the UE, determine at least one first DRX group to enter the DRX inactive state.

In a possible embodiment of the present disclosure, the indication information is transmitted through one of an MAC CE, DCI or RRC signaling.

In still yet another aspect, the present disclosure provides in some embodiments a computer-readable storage medium storing therein a computer program. The computer program is executed by a processor so as to implement the above-mentioned DRX configuration methods.

In still yet another aspect, the present disclosure provides in some embodiments a UE, including: a first reception module configured to receive indication information transmitted by a network side device, the indication information being used to indicate at least one first DRX group for the UE to enter a DRX inactive state; and a configuration module configured to configure the at least one first DRX group to enter the DRX inactive state in accordance with the indication information.

In still yet another aspect, the present disclosure provides in some embodiments a network side device, including a transmission module configured to transmit indication information to a UE. The indication information is used to indicate at least one first DRX group for the UE to enter a DRX inactive state.

The present disclosure has the following beneficial effects. According to the embodiments of the present disclosure, the network side device indicates the at least one first DRX group for the UE to enter the DRX inactive state, and the UE configures the first DRX group to enter the DRX inactive state in accordance with the indication information transmitted by the network side device. As a result, it is able for the UE to enter the DRX inactive state with respect to a specific DRX group, thereby to provide more indication modes for the DRX inactive state and meet the demand on the UE.

BRIEF DESCRIPTION OF THE DRAWINGS

FIG. 4 is another schematic view showing the MAC CE format;
FIG. 5 is another flow chart of the DRX state configuration method according to one embodiment of the present disclosure;
FIG. 6 is a schematic view showing a UE according to one embodiment of the present disclosure.

DETAILED DESCRIPTION

In order to make the objects, the technical solutions and the advantages of the present disclosure more apparent, the present disclosure will be described hereinafter in a clear and complete manner in conjunction with the drawings and embodiments.

At first, some relevant concepts in the embodiments of the present disclosure will be described hereinafter.

1. DRX Configuration

In 4$^{th}$-Generation (4G) and 5$^{th}$-Generaiton (5G, or New Radio (NR)) mobile communication system, DRX has been introduced, so as to enable a UE to enter a sleep state periodically, i.e., enable the UE not to monitor a Physical Downlink Control Channel (PDCCH) subframe/slot. When the UE needs to monitor the PDCCH subframe/slot, it is waken up from the sleep state. In this way, it is able to reduce the power consumption. Especially for the UE where a delay is less demanded and the power consumption is highly demanded, through the DRX, it is able to reduce the power consumption, so the DRX is significant.

Figure 1:
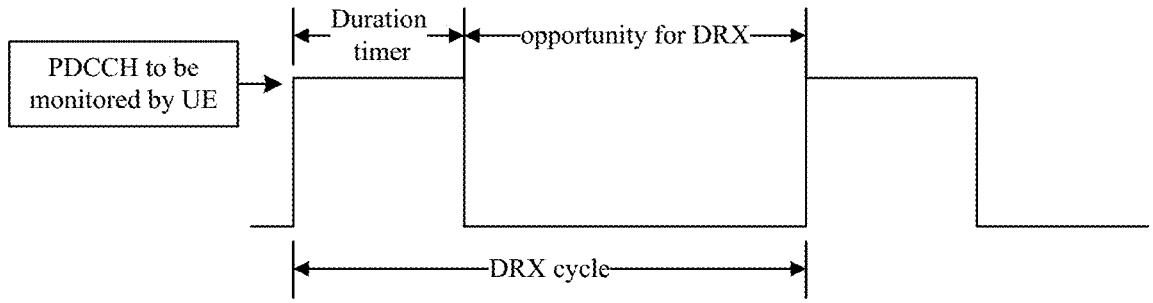
FIG. 1 is a schematic view showing a DRX format.

A DRX mechanism is implemented in different ways in an idle state and a connected state. FIG. 1 shows the DRX mechanism in the connected state. A time period indicated by "duration" is a time period where a downlink PDCCH subframe is monitored by the UE, and the UE is in a wake-up state within this time period. A time period indicated by "opportunity for DRX" is a time period where the DRX probably enters a sleep state, i.e., a time period where the UE enters the sleep state and does not monitor the PDCCH subframe so as to save power. The UE may enter a DRX active state due to Uplink (UL) transmission. As shown in FIG. 1, the longer the time period within which the DRX is in the sleep state, the lower the power consumption for the UE, and the longer the delay for the service transmission. "Opportunity for DRX" may also be described as a DRX off state or a DRX inactive state.

Interpretations of DRX Parameters

"onDurationTimer" indicates the quantity of consecutive PDCCH subframes to be monitored (i.e., the quantity of consecutive subframes within the active state) starting from a start subframe of a DRX period. The UE enters the DRX active state within the time period where "onDuration-Timer" is started.

"drx-InactivityTimer" indicates the quantity of consecutive subframes in the active state after the UE has successfully decoded a PDCCH indicating initially-transmitted UL or Downlink (DL) user data. In other words, the timer is restarted each time the initially-transmitted data, rather than re-transmitted data, is scheduled or transmitted by the UE. The UE enters the DRX active state within the time period where "drx-InactivityTimer" is started.

Long/short DRX cycle: sometimes, the service arrives suddenly, and after a certain time period, a service interval increases. Hence, in the DRX mechanism, the long/short DRX cycle has been introduced. When there is the service transmission, the short DRX cycle is adopted by the UE, and a short DRX cycle timer is started/restarted. After the short DRX cycle timer has expired, the long DRX cycle is adopted by the UE.

In an NR system, there are two 5G frequency ranges, i.e., FR1 and FR2. FR1 is commonly known as sub-6 GHz, i.e., a frequency range lower than 6 GHz, which is currently a mainstream 5G frequency range.

The lower the frequency, the stronger the coverage capacity as well as the penetrating capacity. However, in the related art, a frequency range lower than 3 GHz has already been adopted in a previous network, which differs from country to country. Hence, 3.5 GHz is a mainstream 5G frequency range. In addition, the 3$^{rd}$-Generation Partnership Project (3GPP) has defined the other available frequency bands for flexible deployment.

FR2 is mainly a high-frequency range, and it is commonly known as millimeter wave, which has weak penetrating capacity, very sufficient bandwidth resources and no interference resources. Hence, a clean frequency spectrum is provided, and it has a broad application range.

Table 1 shows FR1 and FR2.

TABLE 1

| Name | Range |
|---|---|
| FR1 | 450 MHz-6000 MHz |
| FR2 | 24250 MHz-52600 MHz |

The frequency in FR2 is higher, so a larger bandwidth, a wider Subcarrier Space (SC S) and a shorter slot may be selected. In addition, higher data throughput may be carried within FR2, so it is able to transmit the service more rapidly.

Two DRX groups may be configured for a same MAC entity, i.e., different DRX configurations may be configured for FR1 and FR2. In parameters of the two DRX configurations, onDurationTimer and drx-InactivityTimer are allowed to be different. Within FR2, each of onDuration-Timer and drx-InactivityTimer is shorter, so the power consumption may be reduced within FR2.

An object of the present disclosure is to provide a DRX state configuration method, a UE and a network side device, so as to solve the problem in the related art where the DRX inactive state is merely indicated in a simple way with respect to the UE and it is impossible to meet the demand on the UE.

Figure 2:
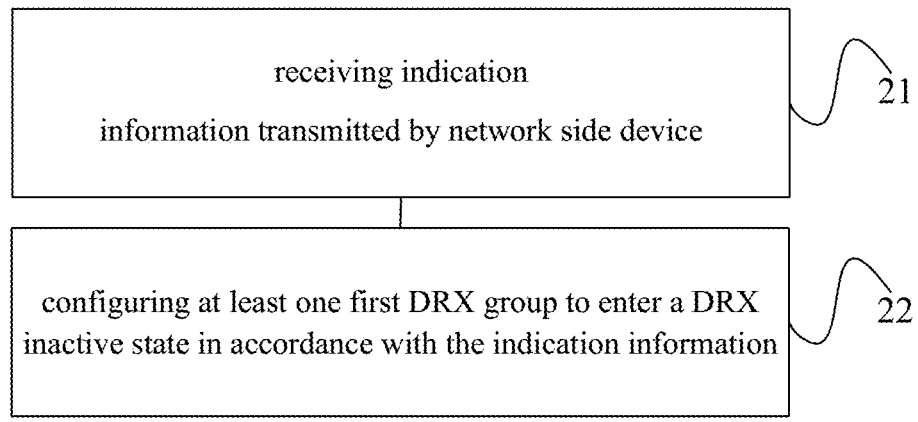
FIG. 2 is a flow chart of a DRX state configuration method according to one embodiment of the present disclosure.

As shown in FIG. 2, the present disclosure provides in some embodiments a DRX state configuration method for a UE, which includes the following steps.

Step 21: receiving indication information transmitted by a network side device.

It should be appreciated that, the indication information is used to indicate at least one first DRX group for the UE to enter a DRX inactive state.

Step 22: configuring the at least one first DRX group to enter the DRX inactive state in accordance with the indication information.

It should be appreciated that, when some DRX groups for the UE need to enter the DRX inactive state, the network side device needs to transmit an indication indicating the DRX groups to enter the DRX inactive state to the UE. The UE stops a timer corresponding to each DRX group indicated by the network side device in accordance with the indication transmitted by the network side device, so as to change the state of the DRX group. In this way, it is able to perform the state change with respect to the DRX group, thereby to improve the state updating flexibility.

To be specific, the configuring the at least one first DRX group to enter the DRX inactive state includes at least one of: A11 of stopping a DRX on-duration timer corresponding to the first DRX group; A12 of stopping a DRX inactivity timer corresponding to the first DRX group; or A13 of stopping a DRX retransmission timer corresponding to the first DRX group.

It should be appreciated that, based on any of A11 to A13, the configuring the at least one first DRX group to enter the DRX inactive state further includes stopping a DRX Hybrid Automatic Repeat reQuest (HARM) Round Trip Time (RTT) timer corresponding to the first DRX group.

It should be appreciated that, the indication information is transmitted through one of an MAC CE, DCI or RRC signaling.

It should be further appreciated that, the indication information may carry specific DRX group information, or a service cell ID or a carrier ID. The UE may determine the DRX group in accordance with the serving cell ID or the carrier ID. Detailed description will be given hereinafter when different contents are carried in the indication information.

1. the DRX Group Information is Carried in the Indication Information.

It should be appreciated that, in this case, prior to Step 21, the DRX state configuration method further includes receiving a DRX parameter configured by the network side device for the UE and group-related information, and the group-related information includes DRX groups.

To be specific, the indication information includes at least one piece of information about a target DRX group, and the first DRX group is a DRX group determined in accordance with the information about the target DRX group.

It should be appreciated that, in this case, one piece of information about the target DRX group corresponds to one DRX group. When there are several pieces of information about the target DRX groups in the indication information, the UE may determine the quantity of DRX groups to enter the DRX inactive state.

To be specific, the information about the target DRX group includes identification information corresponding to the target DRX group, e.g., an index of the group or a group ID.

To be specific, in this case, the following steps are mainly implemented by the network side device.

Step 1: the network side device configures the DRX parameter and the DRX groups for the UE.

Step 2: the network side device determines that there is no data in a cache of a first logic channel for the UE or there is no downlink data in the network side device for the UE, so as to determine at least one first DRX group to enter the DRX inactive state. Then, the network side device transmits first signaling carrying the indication information to the UE, and the indication information is used to indicate the DRX groups for which DRX onduration Timer and DRX inactivityTimer are to be stopped.

To be specific, the first signaling is an MAC CE, DCI or RRC signaling.

To be specific, the first signaling includes the DRX group information about the DRX group in the DRX inactive state, and the DRX group information includes identification information corresponding to the DRX group. In a possible embodiment of the present disclosure, the DRX group information further includes a serving cell ID or a carrier ID corresponding to the DRX group.

For example, the network side device configures N DRX groups for the UE, where N is an integer greater than or equal to 2. It should be appreciated that, the above-mentioned numerical range of N is for illustrative purposes only, and a specific value of N will not be particularly defined herein. The network side device assigns an index to each DRX group, e.g., DRX group 0, DRX group 1, . . . DRX group N−1.

The first signaling includes an index M, where M is an integer greater than or equal to 0 and smaller than N. The index M is used to indicate that DRX onduration Timer and DRX inactivity Timer for the DRX group M are to be stopped.

Figure 3:
FIG. 3 is a schematic view showing an MAC CE format.

In a possible embodiment of the present disclosure, when the first signaling is the MAC CE, FIG. 3 shows a format of the MAC CE, where LCID represents a logical channel ID of the MAC CE, and GID represents a DRX group ID. Here, GID includes two bits so as to indicate four groups, i.e., group 0 (00), group 1 (01), group 2 (10) and group 3 (11).

Of course, GID may include more bits, which will not be particularly defined herein. In a possible embodiment of the present disclosure, the MAC CE may also be in the form of a bitmap, which will not be particularly defined herein.

It should be further appreciated that, when the first signaling is the DCI, due to a limitation of a length of the DCI, the identification information corresponding to the DRX group is carried in the DCI (i.e., in this case, the DRX group information merely includes the identification information corresponding to the DRX group). It should be further appreciated that, the DCI may be a power saving signal indicating whether DRX ondurationTimer is to be started by the UE.

To be specific, in this case, the following steps are mainly implemented by the UE.

Step 1: the UE receives the DRX parameter and the DRX groups configured by the network side device.

Step 2: the UE receives the first signaling transmitted by the network side device, and stops, in accordance with the first signaling, DRX ondurationTimer and DRX inactivityTimer for the DRX group indicated through the indication information carried in the first signaling.

To be specific, the information transmitted by the network side device is received by the UE, i.e., the information transmitted by the network side device is the same as the information received by the UE.

Detailed description will be given hereinafter.

The network side device configures N DRX groups for the UE, where N is an integer greater than or equal to 2. It should be appreciated that, the above-mentioned numerical range of N is for illustrative purposes only, and a specific value of N will not be particularly defined herein. The network side device assigns an index to each DRX group, e.g., DRX group 0, DRX group 1, . . . , DRX group N−1.

When the indication information is transmitted through the MAC CE, the MAC CE includes an index M, where M is an integer greater than or equal to 0 and smaller than N. The index M is used to indicate that DRX ondurationTimer and DRX inactivityTimer for the DRX group M are to be stopped.

Upon the receipt of the indication information carried in the MAC CE, the UE stops DRX ondurationTimer and DRX inactivityTimer for the DRX group indicated in the indication information, so that the corresponding DRX group enters the DRX inactive state.

2. The Serving Cell Id or Carrier Id is Carried in the Indication Information.

It should be appreciated that, in this case, prior to Step 21, the DRX state configuration method further includes receiving a DRX parameter configured by the network side device for the UE and group-related information. The group-related information includes DRX groups and a first parameter corresponding to each DRX group, and the first parameter includes a serving cell ID or a carrier ID.

To be specific, the indication information includes at least one target first parameter, and the first DRX group is a DRX group corresponding to the target first parameter.

It should be appreciated that, one target first parameter corresponds to one DRX group. Based on a correspondence between the target first parameter and the DRX group, it is able to determine the DRX groups to enter the DRX inactive state.

To be specific, in this case, the following steps are mainly implemented by the network side device.

Step 1: the network side device configures the DRX parameter, the DRX groups and the serving cell ID or carrier ID corresponding to each DRX group for the UE.

Step 2: the network side device determines that there is no data in the cache of the first logic channel for the UE or the network side device does not transmit any downlink data to the UE, so as to determine at least one first DRX group to enter the DRX inactive state. Then, the network side device transmits first signaling carrying the indication information to the UE, and the indication information is used to indicate the DRX groups for which DRX ondurationTimer and DRX inactivityTimer are to be stopped.

To be specific, the first signaling is an MAC CE, DCI or RRC signaling.

To be specific, the first signaling includes the serving cell ID or the carrier ID.

For example, the network side device configures N DRX groups for the UE, where N is an integer greater than or equal to 2. The network side device configures a serving cell corresponding to each DRX group, e.g., serving cell IDs or carrier IDs corresponding to a DRX group 0 is 0, 1, . . . , P, and serving cell IDs or carrier IDs corresponding to a DRX group 1 is P+1, P+2, . . . , Q, where each of P and Q is an integer greater than or equal to 0.

The first signaling includes the serving cell ID or the carrier ID. For example, the DRX group 0 corresponds to a part of, or all of, the serving cells or carriers, and the DRX group 1 corresponds to a part of, or all of, the serving cells or carriers.

In a possible embodiment of the present disclosure, when the first signaling is the MAC CE, FIG. 4 shows a format of the MAC CE, where LCID represents a logical channel ID of the MAC CE, Ci represents a serving cell ID or a carrier ID, and i is an integer greater than or equal to 0. Here, eight serving cells or carriers are taken as an example. When Ci=1, it means that the network side device indicates that DRX ondurationTimer and DRX inactivityTimer are to be stopped for the DRX group corresponding to the serving cell or carrier Ci. Of course cell, the serving cell DI or carrier ID may include more bits, which will not be particularly defined herein.

It should be further appreciated that, when the first signaling is the DCI, due to a limitation of a length of the DCI, the indication information carried in the DCI merely includes the serving cell ID or the carrier ID (e.g., ID information).

To be specific, in this case, the following steps are mainly implemented by the UE.

Step 1: the UE receives the DRX parameter, the DRX groups and the serving cell ID or carrier ID corresponding to the DRX group configured by the network side device.

Step 2: the UE receives the first signaling transmitted by the network side device, and determines the DRX group to enter the DRX inactive state in accordance with the serving cell ID or carrier ID indicated through the indication information carried in the first signaling.

Step 3: the UE stops DRX ondurationTimer and DRX inactivityTimer corresponding to the DRX group indicated in the indication information, so that the corresponding DRX group enters the DRX inactive state.

It should be appreciated that, the information transmitted by the network side device is received by the UE, i.e., the information transmitted by the network side device is the same as the information received by the UE.

In a word, according to the embodiments of the present disclosure, it is able to stop DRX ondurationTimer and DRX inactivityTimer corresponding to a specific DRX group or a DRX group corresponding to a specific cell or carrier, thereby to provide more indication modes for the DRX inactive state and meet the demand on the UE.

As shown in FIG. 5, the present disclosure further provides in some embodiments a DRX state configuration method for a network side device, which includes Step 51 of transmitting indication information to a UE. The indication information is used to indicate at least one first DRX group for the UE to enter a DRX inactive state.

In a possible embodiment of the present disclosure, prior to Step 51, the DRX state configuration method further includes configuring a DRX parameter and group-related information for the UE, the group-related information includes DRX groups, or the DRX groups and a first parameter corresponding to each DRX group, and the first parameter includes a serving cell ID or a carrier ID.

Further, when the group-related information includes the DRX groups, the indication information includes at least one piece of information about a target DRX group, and the first DRX group is a DRX group determined in accordance with the information about the target DRX group.

To be specific, the information about the target DRX group includes identification information corresponding to the target DRX group.

Further, when the group-related information includes the DRX groups and the first parameter corresponding to each DRX group, the indication information includes at least one target first parameter, and the first DRX group is a DRX group corresponding to the target first parameter.

In a possible embodiment of the present disclosure, prior to Step 51, the DRX state configuration method further includes, in the case that there is no data in a cache for a first logic channel of the UE and/or there is no downlink data in the network side device for the UE, determining at least one first DRX group to enter the DRX inactive state.

To be specific, the indication information is transmitted through one of an MAC CE, DCI or RRC signaling.

It should be appreciated that, the implementation of the DRX state configuration method may refer to that of the network side device mentioned hereinabove, with a same technical effect.

As shown in FIG. 6, the present disclosure further provides in some embodiments a UE 60, which includes: a first reception module 61 configured to receive indication information transmitted by a network side device, the indication information being used to indicate at least one first DRX group for the UE to enter a DRX inactive state; and a configuration module 62 configured to configure the at least one first DRX group to enter the DRX inactive state in accordance with the indication information.

In a possible embodiment of the present disclosure, the UE further includes a second reception module configured to, before the first reception module 61 receives the indication information transmitted by the network side device, receive a DRX parameter configured by the network side device for the UE and group-related information, the group-related information includes DRX groups, or the DRX groups and a first parameter corresponding to each DRX group, and the first parameter includes a serving cell ID or a carrier ID.

Further, when the group-related information includes the DRX groups, the indication information includes at least one piece of information about a target DRX group, and the first DRX group is a DRX group determined in accordance with the information about the target DRX group.

To be specific, the information about the target DRX group includes identification information corresponding to the target DRX group.

Further, when the group-related information includes the DRX groups and the first parameter corresponding to each DRX group, the indication information includes at least one target first parameter, and the first DRX group is a DRX group corresponding to the target first parameter.

To be specific, the indication information is transmitted through one of an MAC CE, DCI or RRC signaling.

Further, the configuration module 62 is configured to configure the at least one first DRX group to enter the DRX inactive state, so as to perform at least one of stopping a DRX on-duration timer corresponding to the first DRX group, stopping a DRX inactivity timer corresponding to the first DRX group, or stopping a DRX retransmission timer corresponding to the first DRX group.

It should be appreciated that, the implementation of the UE may refer to that of the DRX state configuration method mentioned hereinabove, with a same technical effect.

Figure 7:
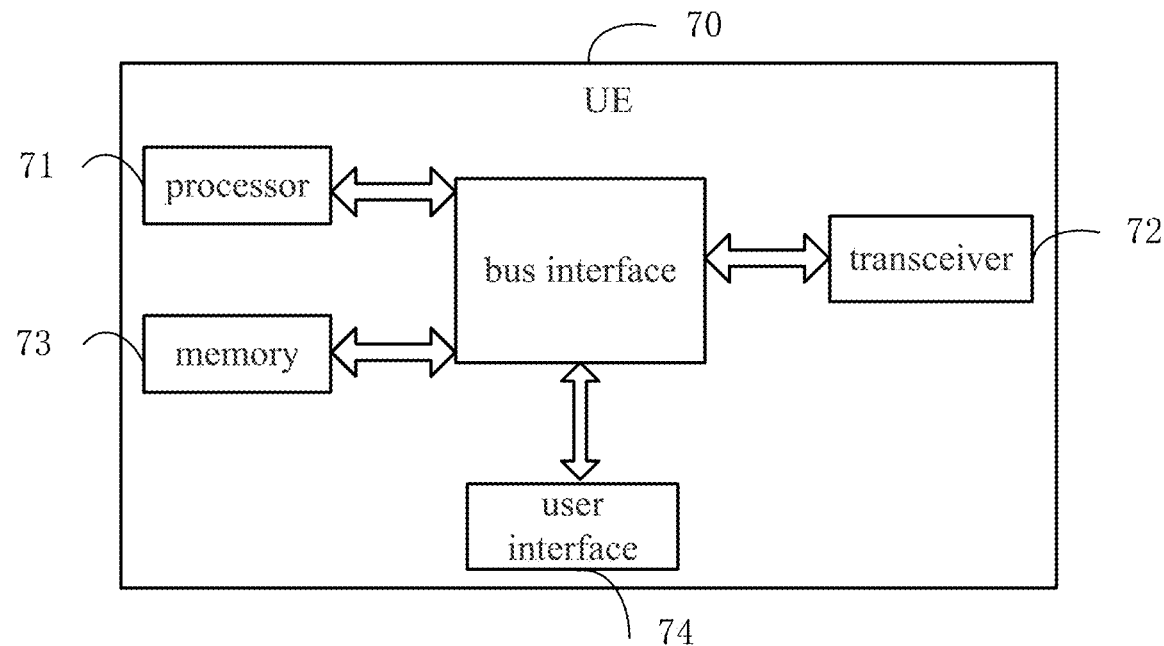
FIG. 7 is a block diagram of the UE according to one embodiment of the present disclosure.

As shown in FIG. 7, the present disclosure further provides in some embodiments a UE 70, which includes a processor 71, a transceiver 72, a memory 73, and a program stored in the memory 73 and executed by the processor 71. The transceiver 72 is coupled to the processor 71 and the memory 73 through a bus interface. The processor 71 is configured to execute the program so as to: receive through the transceiver 72 indication information transmitted by a network side device, the indication information being used to indicate at least one first DRX group for the UE to enter a DRX inactive state; and configure the at least one first DRX group to enter the DRX inactive state in accordance with the indication information.

It should be appreciated that, in FIG. 7, bus architecture may include a number of buses and bridges connected to each other, so as to connect various circuits for one or more processors 71 and one or more memories 73. In addition, as is known in the art, the bus architecture may be used to connect any other circuits, such as a circuit for a peripheral device, a circuit for a voltage stabilizer and a power management circuit, which are not particularly defined herein. The bus interface may be provided, and the transceiver 72 may consist of a plurality of elements, i.e., a transmitter and a receiver for communication with any other devices over a transmission medium. With respect to different UEs, a user interface 74 may also be provided for devices which are to be arranged inside or outside the UE, and these devices may include but not limited to a keypad, a display, a speaker, a microphone and a joystick. The processor 71 may take charge of managing the bus architecture as well general processings, e.g., running a general-purpose operating system. The memory 73 may store data therein for the operation of the processor 71.

In a possible embodiment of the present disclosure, prior to receiving the indication information transmitted by the network side device, the processor is further configured to execute the program so as to receive through the transceiver 72 a DRX parameter configured by the network side device for the UE and group-related information, the group-related information includes DRX groups, or the DRX groups and a first parameter corresponding to each DRX group, and the first parameter includes a serving cell ID or a carrier ID.

Further, when the group-related information includes the DRX groups, the indication information includes at least one piece of information about a target DRX group, and the first DRX group is a DRX group determined in accordance with the information about the target DRX group.

To be specific, the information about the target DRX group includes identification information corresponding to the target DRX group.

Further, when the group-related information includes the DRX groups and the first parameter corresponding to each DRX group, the indication information includes at least one target first parameter, and the first DRX group is a DRX group corresponding to the target first parameter.

To be specific, the indication information is transmitted through one of an MAC CE, DCI or RRC signaling.

In a possible embodiment of the present disclosure, when configuring the at least one first DRX group to enter the DRX inactive state, the processor is configured to execute the program so as to perform at least one of stopping a DRX on-duration timer corresponding to the first DRX group, stopping a DRX inactivity timer corresponding to the first DRX group, or stopping a DRX retransmission timer corresponding to the first DRX group.

The present disclosure further provides in some embodiments a computer-readable storage medium storing therein a computer program. The computer program is executed by a processor so as to implement the steps of the DRX state configuration method for the UE.

Figure 8:
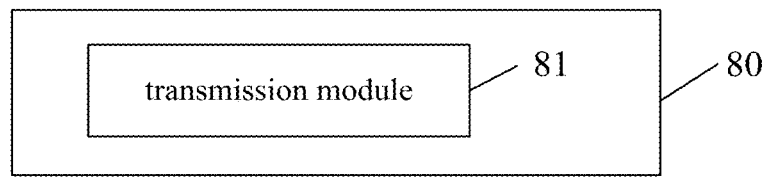
FIG. 8 is a schematic view showing a network side device according to one embodiment of the present disclosure.

As shown in FIG. 8, the present disclosure provides in some embodiments a network side device 80, which includes a transmission module 81 configured to transmit indication information to a UE, and the indication information is used to indicate at least one first DRX group for the UE to enter a DRX inactive state.

In a possible embodiment of the present disclosure, the network side device further includes a parameter configuration module configured to, before the indication information is transmitted by the transmission module 81 to the UE, configure a DRX parameter and group-related information for the UE, the group-related information includes DRX groups, or the DRX groups and a first parameter corresponding to each DRX group, and the first parameter includes a serving cell ID or a carrier ID.

Further, when the group-related information includes the DRX groups, the indication information includes at least one piece of information about a target DRX group, and the first DRX group is a DRX group determined in accordance with the information about the target DRX group.

To be specific, the information about the target DRX group includes identification information corresponding to the target DRX group.

Further, when the group-related information includes the DRX groups and the first parameter corresponding to each DRX group, the indication information includes at least one target first parameter, and the first DRX group is a DRX group corresponding to the target first parameter.

In a possible embodiment of the present disclosure, the network side device further includes a determination module configured to, before the indication information is transmitted by the transmission module 81 to the UE, determine at least one first DRX group to enter the DRX inactive state in the case that there is no data in a cache for a first logic channel of the UE and/or there is no downlink data in the network side device for the UE.

To be specific, the indication information is transmitted through one of an MAC CE, DCI or RRC signaling.

It should be appreciated that, the implementation of the network side device may refer to that of the method mentioned hereinabove, with a same technical effect.

Figure 9:
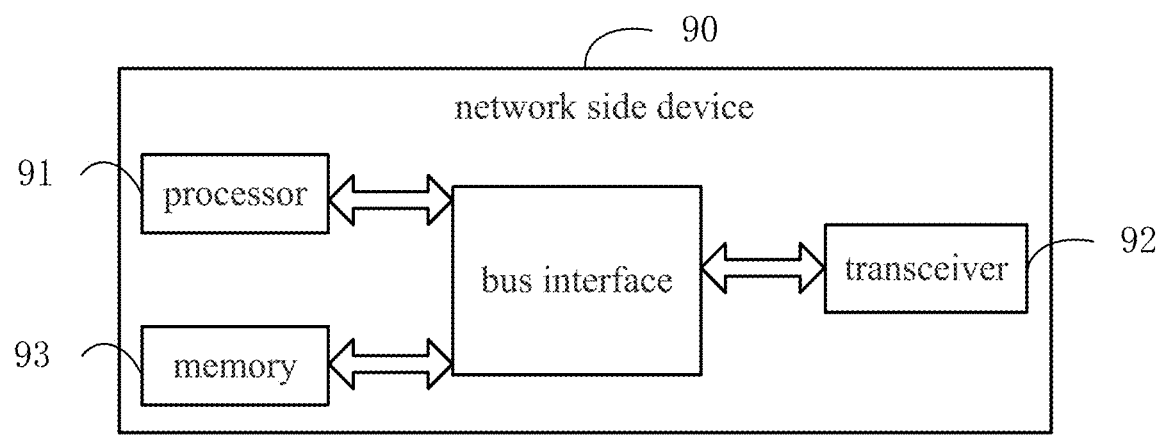
FIG. 9 is a block diagram of the network side device according to one embodiment of the present disclosure.

As shown in FIG. 9, the present disclosure further provides in some embodiments a network side device 90, which includes a processor 91, a transceiver 92, a memory 93, and a program stored in the memory 93 and executed by the processor 91. The transceiver 92 is coupled to the processor 91 and the memory 93 through a bus interface. The processor 91 is configured to execute the program so as to transmit through the transceiver 92 indication information to a UE, and the indication information is used to indicate at least one first DRX group for the UE to enter a DRX inactive state.

It should be appreciated that, in FIG. 9, bus architecture may include a number of buses and bridges connected to each other, so as to connect various circuits for one or more processors 91 and one or more memories 93. In addition, as is known in the art, the bus architecture may be used to connect any other circuits, such as a circuit for a peripheral device, a circuit for a voltage stabilizer and a power management circuit. The bus interface may be provided, and the transceiver 92 may consist of a plurality of elements, i.e., a transmitter and a receiver for communication with any other devices over a transmission medium. The processor 91 may take charge of managing the bus architecture as well as general processings. The memory 93 may store therein data for the operation of the processor 91.

In a possible embodiment of the present disclosure, prior to transmitting the indication information to the UE, the processor is further configured to execute the program so as to configure a DRX parameter and group-related information for the UE, the group-related information includes DRX groups, or the DRX groups and a first parameter corresponding to each DRX group, and the first parameter includes a serving cell ID or a carrier ID.

Further, in a possible embodiment of the present disclosure, when the group-related information includes the DRX groups, the indication information includes at least one piece of information about a target DRX group, and the first DRX group is a DRX group determined in accordance with the information about the target DRX group.

To be specific, the information about the target DRX group includes identification information corresponding to the target DRX group.

Further, when the group-related information includes the DRX groups and the first parameter corresponding to each DRX group, the indication information includes at least one target first parameter, and the first DRX group is a DRX group corresponding to the target first parameter.

In a possible embodiment of the present disclosure, prior to transmitting the indication information to the UE, the processor is further configured to execute the program so as to, in the case that there is no data in a cache for a first logic channel of the UE and/or there is no downlink data in the network side device for the UE, determine at least one first DRX group to enter the DRX inactive state.

To be specific, the indication information is transmitted through one of an MAC CE, DCI or RRC signaling.

The network side device may be a Base Transceiver Station (BTS) in Global System of Mobile communication (GSM) or a Code Division Multiple Access (CDMA) system, a NodeB (NB) in a Wideband Code Division Multiple Access (WCDMA) system, an Evolutional Node B (eNB or eNodeB) in a Long Term Evolution (LTE) system, a relay or an access point, a Next Generation Node B (ng-NB) in a future 5G network, or a Central Unit (CU) or a Distributed Unit (DU), which will not be particularly defined herein.

It should be appreciated that, the embodiments of the present disclosure may be implemented by hardware, software, firmware, middleware, microcode or a combination thereof. For the hardware implementation, the processor may include one or more of an Application Specific Integrated Circuit (ASIC), a digital signal processor (Digital Signal Processor, DSP), a DSP device (DSPD), a programmable logic device (Programmable Logic Device, PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

The present disclosure further provides in some embodiments a computer-readable storage medium storing therein a computer program. The computer program is executed by a processor so as to implement the steps of the above-mentioned DRX state configuration method for the network side device.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A Discontinuous Reception (DRX) state configuration method, applied to a User Equipment (UE), comprising:
   receiving indication information transmitted by a network side device, the indication information being used to indicate at least one first DRX group for the UE to enter a DRX inactive state; and
   configuring the at least one first DRX group to enter the DRX inactive state in accordance with the indication information;
   wherein prior to receiving the indication information transmitted by the network side device, the DRX state configuration method further comprises:
   receiving a DRX parameter configured by the network side device for the UE and group-related information;
   wherein the group-related information comprises DRX groups, or the DRX groups and a first parameter corresponding to each DRX group; and
   the first parameter comprises a serving cell Identity (ID) or a carrier ID;
   wherein when the group-related information comprises the DRX groups, the indication information comprises at least one piece of information about a target DRX group, and the first DRX group is a DRX group determined in accordance with the information about the target DRX group;
   wherein the information about the target DRX group comprises identification information corresponding to the target DRX group.

2. The DRX state configuration method according to claim 1, wherein when the group-related information comprises the DRX groups and the first parameter corresponding to each DRX group, the indication information comprises at least one target first parameter, and the first DRX group is a DRX group corresponding to the target first parameter.

3. The DRX state configuration method according to claim 1, wherein the indication information is transmitted through one of a Media Access Control Control Element (MAC CE), Downlink Control Information (DCI) or Radio Resource Control (RRC) signaling.

4. The DRX state configuration method according to claim 1, wherein the configuring the at least one first DRX group to enter the DRX inactive state comprises at least one of:

stopping a DRX on-duration timer corresponding to the first DRX group, stopping a DRX inactivity timer corresponding to the first DRX group, or stopping a DRX retransmission timer corresponding to the first DRX group.

5. A computer-readable storage medium storing therein a computer program, wherein the computer program is executed by a processor so as to implement the DRX state configuration method according to claim 1.

6. A DRX state configuration method, applied to a network side device, comprising transmitting indication information to a UE, wherein the indication information is used to indicate at least one first DRX group for the UE to enter a DRX inactive state;
   wherein prior to transmitting the indication information to the UE, the DRX state configuration method further comprises configuring a DRX parameter and group-related information for the UE, the group-related information comprises DRX groups, or the DRX groups and a first parameter corresponding to each DRX group, and the first parameter comprises a serving cell ID or a carrier ID;
   wherein when the group-related information comprises the DRX groups, the indication information comprises at least one piece of information about a target DRX group, and the first DRX group is a DRX group determined in accordance with the information about the target DRX group;
   wherein the information about the target DRX group comprises identification information corresponding to the target DRX group.

7. The DRX state configuration method according to claim 6, wherein when the group-related information comprises the DRX groups and the first parameter corresponding to each DRX group, the indication information comprises at least one target first parameter, and the first DRX group is a DRX group corresponding to the target first parameter.

8. The DRX state configuration method according to claim 6, wherein prior to transmitting the indication information to the UE, the DRX state configuration method further comprises, in the case that there is no data in a cache for a first logic channel of the UE and/or there is no downlink data in the network side device for the UE, determining at least one first DRX group to enter the DRX inactive state.

9. The DRX state configuration method according to claim 6, wherein the indication information is transmitted through one of an MAC CE, DCI or RRC signaling.

10. A network side device, comprising a transceiver, a memory, a processor, and a program stored in the memory and executed by the processor, wherein the processor is configured to execute the program so as to implement the DRX state configuration method according to claim 6.

11. A UE, comprising a transceiver, a memory, a processor, and a program stored in the memory and executed by the processor, wherein the processor is configured to execute the program so as to: receive through the transceiver indication information transmitted by a network side device, the indication information being used to indicate at least one first DRX group for the UE to enter a DRX inactive state; and configure the at least one first DRX group to enter the DRX inactive state in accordance with the indication information;
   wherein prior to receiving the indication information transmitted by the network side device, the processor is further configured to execute the program so as to receive through the transceiver a DRX parameter configured by the network side device for the UE and group-related information, the group-related information comprises DRX groups, or the DRX groups and a first parameter corresponding to each DRX group, and the first parameter comprises a serving cell ID or a carrier ID;
   wherein when the group-related information comprises the DRX groups, the indication information comprises at least one piece of information about a target DRX group, and the first DRX group is a DRX group determined in accordance with the information about the target DRX group;
   wherein the information about the target DRX group comprises identification information corresponding to the target DRX group.

* * * * *